Figure 1:
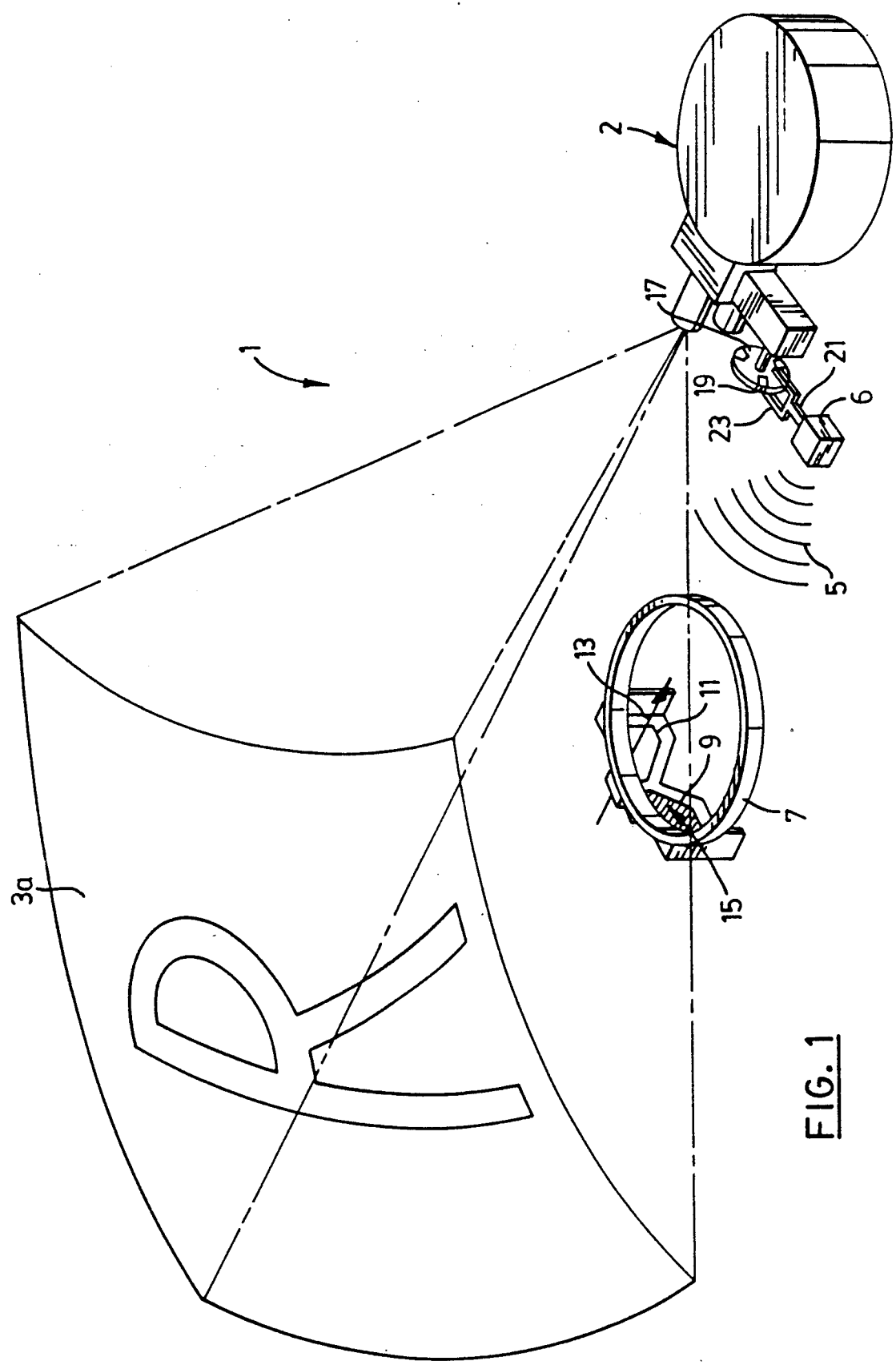

United States Patent [19]
Baljet et al.

[11] Patent Number: 5,002,387
[45] Date of Patent: Mar. 26, 1991

[54] PROJECTION SYNCHRONIZATION SYSTEM

[75] Inventors: Anton L. Baljet, Oakville, Canada; Gerard C. Carter, Wes MacKay, Australia; Gordon W. Harris, Oakville, Canada

[73] Assignee: Imax Systems Corporation, Toronto, Canada

[21] Appl. No.: 498,158

[22] Filed: Mar. 23, 1990

[51] Int. Cl.⁵ .................... G03B 35/02; G03B 35/16
[52] U.S. Cl. ........................................ 352/63; 350/132
[58] Field of Search ........................... 352/57, 62, 63; 350/132

[56] References Cited

U.S. PATENT DOCUMENTS 3,737,567 6/1973 Kratomi .

FOREIGN PATENT DOCUMENTS 2569281 8/1984 France ................................ 350/132

OTHER PUBLICATIONS

Lipton, Lenny, *Foundations of the Stereoscopic Cinema: A Study in Depth.* Van Nostrand Reinhold: New York, 1982, Chapter 6.

*Primary Examiner*—Monroe H. Hayes
*Attorney, Agent, or Firm*—Rogers, Bereskin & Parr

[57] ABSTRACT

An alternate eye 3-d projection system has a projector projecting alternate eye left and right images, has alternating eye 3-d glasses alternating between left and right lens transmissiveness, and has a phase delay unit synchronizing the left lens transmissiveness to left images and right lens transmissiveness to right images. A timing shutter is driven through a mechanical link to the projector primary mechanism at a frequency proportional to the frequency of the transition between images. A sensor outputs pulses according to the rotationally frequency of the timing shutter. The phase delay unit receives the pulses, a multiplier multiplies the frequency of the pulses, a phase lock loop locks on to the frequency and a counter counts the pulses. After a preset delay the counter outputs a pulse. The delay is adjustable. The counter pulse enables a 60 KHz oscillator. The oscillations are counted by another counter and passed to a transmitter. The 60 KHz oscillations are disabled when the other counter reaches a preset amount. The other counter sets the duty cycle of the transmitter. Each of the components in the unit is duplicated in a back-up section. The back-up section is enabled when the primary phase lock loop is not locked on and the back-up phase locked loop is locked on.

16 Claims, 5 Drawing Sheets

PROJECTION SYNCHRONIZATION SYSTEM

This invention relates to projection systems for motion picture theatres. More particularly, it relates to projection systems for alternate eye 3-dimensional motion pictures.

In an alternate eye 3-dimensional (3-d) motion picture, projected images alternate between images intended for the left eye and right eye of a viewer. Typically, a viewer wears specially adapted glasses having lenses which alternate between opaque and transmissive states. For example, when the left eye image is on the screen the right eye lens is opaque and the left eye lens is transmissive.

Synchronization between the states of the lenses and the projection of the images is an inherent difficulty in 3-d systems. Obviously, if the lenses allow transmission of a left eye image to the right eye, or vice versa, the 3-d effect will be degraded.

It is possible to directly sense when the left and right eye images are being transmitted and send a signal to the glasses to alternate to the appropriate states.

Such simple systems do not have the ability to correct for delays inherent in the synchronization system or to peak the synchronization. Such delays may result in a lag time between sensing and sending. Peak synchronization is dependent on points in the projection of images during which it is best for the signal to be sent which causes the state of the lenses to alternate.

The placement of sensors and other such equipment will be critical to the set-up of the synchronization system. For example, a sensor which is physically displaced from its intended position will introduce an error in the synchronization process.

In a first aspect the present invention provides a 3-d projection system having a projector projecting alternate eye left and right images and having alternate eye 3-d glasses alternating between left lens and right lens transmissiveness, the system comprising: a phase delay unit synchronizing left lens transmissiveness to left images and right lens transmissiveness to right images.

In a second aspect the present invention provides a 3-d projection system having a projector projecting alternate eye left and right images and having a transmitter transmitting signals, the system comprising: a phase delay unit synchronizing the transmission of the signals to the left and right images.

In a third aspect the present invention provides a 3-d projection system having a projector projecting alternate eye left and right images with transitions between successive images and having a transmitter transmitting signals to alternate eye 3-d glasses alternating between left and right lens transmissiveness according to the signals, the system comprising: a phase delay unit synchronizing the transmission of the signals to the transitions between images.

Figure 2:
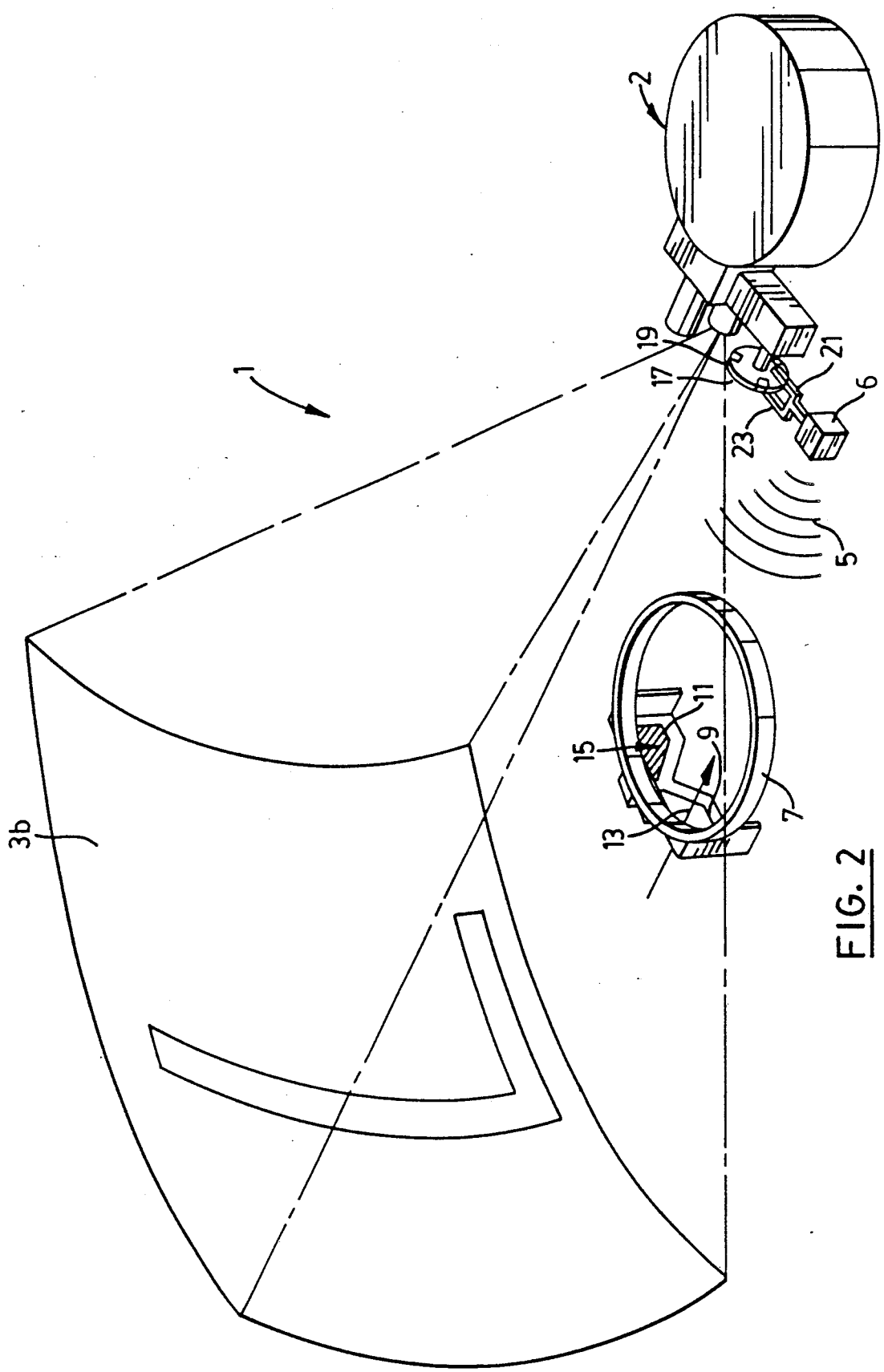
Figure 4:
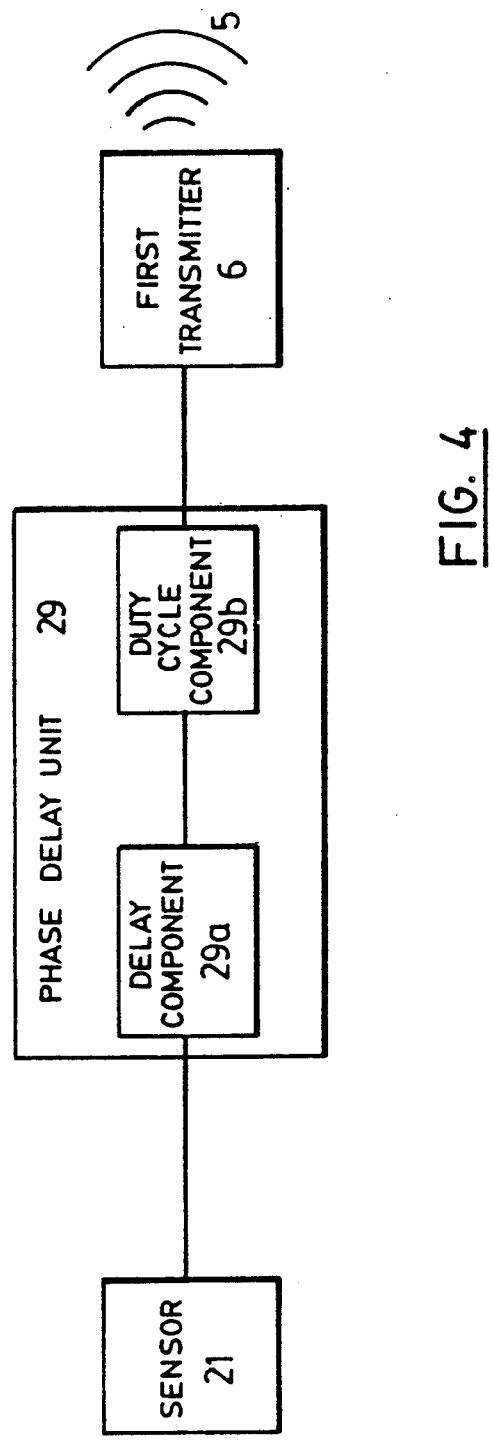

For a better understanding of the present invention, and to show more clearly how it may be carried into effect, reference will now be made, by way of example, to the accompanying drawings, which show a preferred embodiment of the present invention, and in which:

FIG. 1. is a diagrammatic representation of a theatre employing a 3-d projection system during projection of a right eye image;

FIG. 2. is a diagrammatic representation of the theatre of FIG. 1 during projection of a left eye image;

FIG. 3A–3D. is a series of timing diagrams for the system of FIG. 1;

FIG. 4. is a block diagram of a portion of the 3-d system of FIG. 1; and

Figure 5:
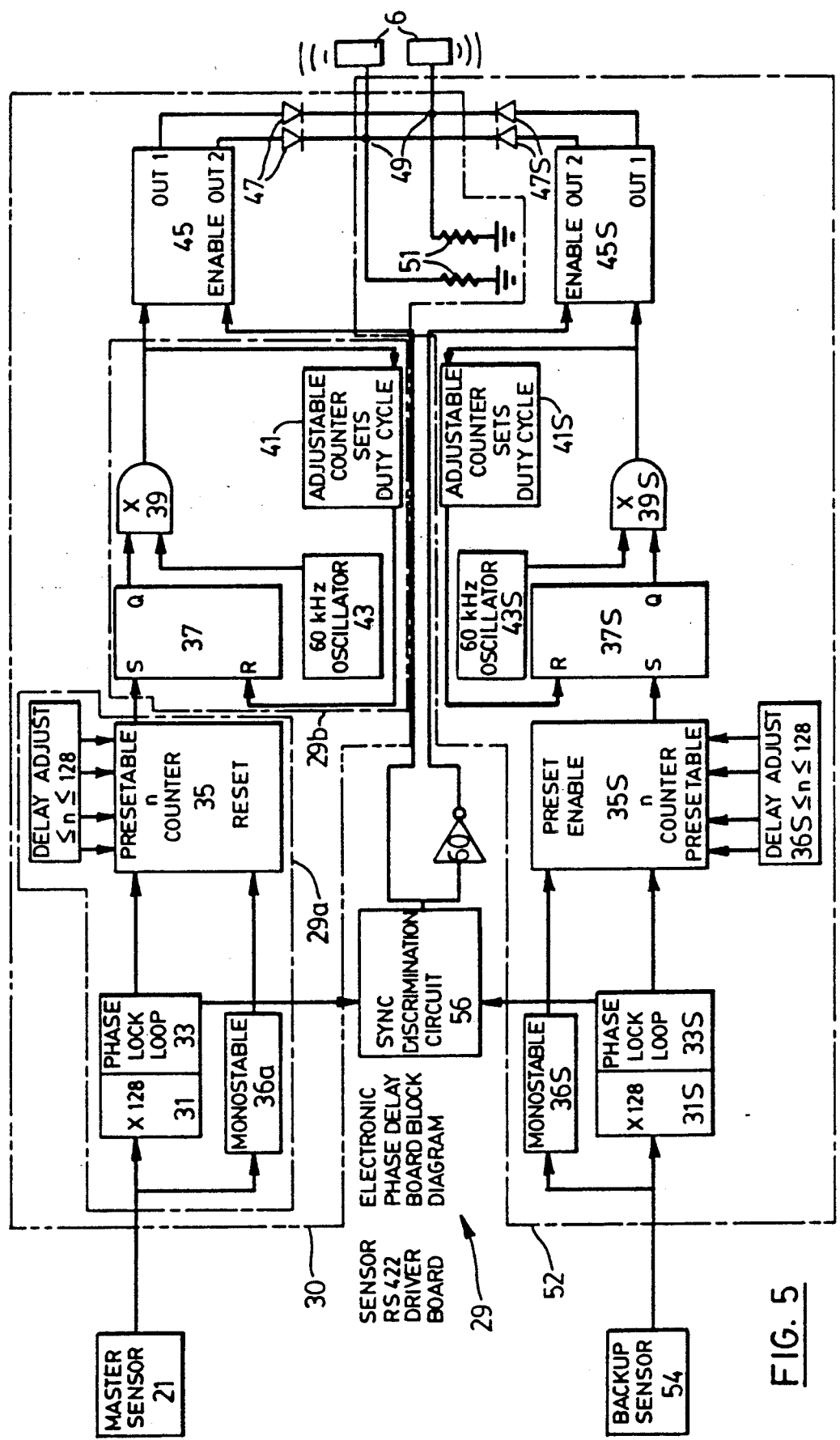

FIG. 5. is a detailed block diagram of a sensing unit and phase delay circuit employed in the system of FIG. 1.

Referring to FIG. 1, a 3-d projection system 1 has a projector 2 for projecting motion picture images 3. The images alternate between left and right eye images 3. In this case the image 3 is a right eye image 3a of the letter R. The projection system 1 also transmits a signal, represented by the arced lines 5, from a first transmitter 6. The signal 5 is received by 3-d glasses 7. For a description of a projector 2 suitable for use in association with the instant 3-d projection system 1, reference is made to related U.S. application Ser. Nos. 365,633, 404,472 and 404,473. These applications are hereby incorporated by reference. A 3-d system employing a TV in place of the projector, but having the other basic components is discussed in U.S. Pat. No. 4,424,529 issued Jan. 3, 1984 to Roese.

The transmitter is an infra red transmitter 6 transmitting infrared signals 5 to an infrared receiver, not shown, in the glasses 7. Other types of transmitters 6 and receivers using other types of signals 5 may be used as demonstrated by the Roese patent however infrared has been found to provide the most effective communication.

The glasses 7 have left and right lenses 9, 11 which alternate between opaque and transmissive states according to the signal 5. When a right eye image 3a is being projected the right eye lens 11 is transmissive, substantially clear, as represented by the arrow 13. The left eye lens 9 is correspondingly opaque, as represented by the diagonal lines 15.

Referring to FIG. 2, the image 3 has alternated to a left eye image 3b of the letter L. The left lens 9 is now transmissive and the right lens 11 is opaque.

To determine when a transition is to occur between left and right eye images 3a, 3b a timing shutter 17 is connected through a mechanical link, not shown, to a primary mechanism, not shown, within the projector 2. The primary mechanism is driven at a frequency proportional to the frequency of the alternation between the images 3a, 3b. The timing shutter 17 will be similarly rotated through the mechanical link by the primary mechanism at a frequency proportional to the frequency of the alternation between images 3a, 3b.

The timing shutter 17 has slots 19 around its periphery. Physically connected to the transmitter 6 is a sensor 21. The sensor 21 has arms 23 extending from the transmitter 6. On one arm 23 is a second transmitter, not shown, while on the other arm 23 is a second receiver, not shown.

As the shutter 17 rotates a transmitted signal from the second transmitter is alternately blocked and passed by the shutter 17. The passed signals will be received by the second receiver. The sensor 21 generates a series of first pulses during the periods when the second receiver is receiving passed signals.

In the preferred embodiment shutter 17 rotates at one-eighth the frequency of the alternation of the images 3. The shutter 17 has four slots 19. This combination generates first pulses at one-half the frequency of the transitions between images 3.

The timing of the alternate eye images is shown in FIG. 3a. As discussed above a left image 3a is followed by a right image 3b and vice versa. The vertical axis of FIG. 3a measures the intensity of the images 3. The images 3 have associated rise and fall times as represented by rounded edges of each image pulse. The rise and fall times are caused by the particular projection method used to create transitions between images 3. Each method will have a noticeable rise and fall time.

Should the transmitter 6 transmit signals 5 at the frequency of the first pulses, or one-half of the frequency of the transitions of the images 3 and a duty cycle equal to the time between transitions, then the timing diagram for the signals 5 would take the shape of FIG. 3b. The vertical axis represents the energy in the signal 5. As will be discussed later the signal will actually take the shape of bursts from a pulse train of 60 KHz. The bursts are shown as square waves for simplicity of representation.

The glasses 7 receive the signals 5 and the timing diagram for the lenses 9, 11 takes the shape of FIG. 3c. The vertical axis represents the transmissiveness of the lenses 9, 11. The transmissiveness of each lens 9, 11 has been superimposed on one another in FIG. 3c. Thus, a left period of transmissiveness is followed by a right eye period of transmissiveness. Each period being represented by the letter L or R on FIG. 3c. While one lens 9 or 11 is transmissive the other lens 11 or 9 is opaque.

The lag between $t_1$ and $t_2$ is a measure of the inherent delay, errors in the physical position of the sensor 21, and errors introduced by the mechanical link. As is evident from comparing FIGS. 3a and 3c, a system 1 set-up in this manner will allow left and right eye images 3 to be transmitted through one lens 9, 11 at the same time. This will degrade or totally eliminate the 3-d effect of the system 1.

In order to synchronize the signal 5 for left lens 9 transmissiveness with a left eye image 3a it is desirable to introduce a phase delay between the first pulses and the signal 5. The phase delay will create a timing diagram for the lenses 9, 11 such as that shown in FIG. 3d. The onset of transmissiveness has been delayed an amount equivalent to $t_3$ minus $t_2$.

Figure 3:
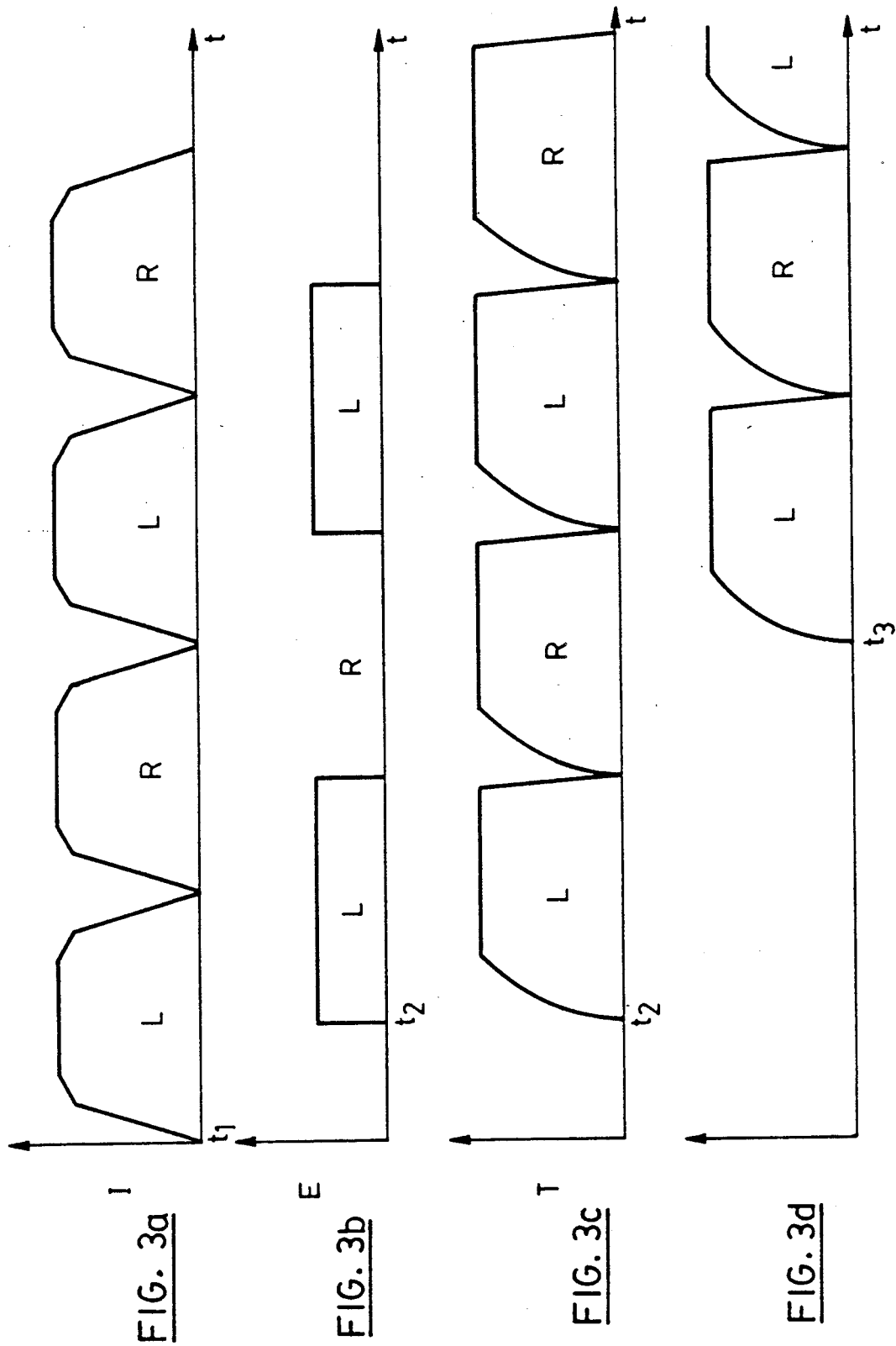

Referring to FIG. 4, electrically connected between the sensor 21 and the first transmitter 6 is a phase delay unit 29, as shown in FIG. 3. The phase delay unit 29 comprises a delay component 29a and the duty cycle component 29b. The delay component 29a receives the first pulses and delays them to synchronize the leading edge of the signal 5 with the image transitions.

Referring to FIG. 5, the phase delay unit 29 has a primary section 30 outlined in dashed lines, comprising the delay component 29a and the duty cycle component 29b each outlined in single dot chained lines. The delay component 29a receives the sensor 21 first pulses at a frequency multiplier 31. Connected to the frequency multiplier 31 is a phase locked loop 33. The phase lock loop 31 has an output to a first counter 35. The counter also has preset inputs connected to a delay adjust element 36. In this case the element 36 incorporates thumb-wheel switches, not shown, capable of selecting one of 128 positions. The counter 35 has a reset input connected to the sensor 21 via a monostable 36a receiving the first pulses. The counter 35 is further connected to the duty cycle component 29b through a set input(s) of an RS flip-flop 37 and an AND gate 39 to a second counter 41 and the selection circuitry 45. Another input to the AND gate 39 is an oscillator 43. The counter 41 is connected to the reset input of the RS flip-flop 37; the selection circuitry 45 is connected via diodes 47 to phase delay unit outputs 49. Connected to the inputs of the outputs 49 are pull down resistors 51.

In operation, the multiplier 31 receives the first pulses. The frequency of the first pulses is multiplied by a given factor, in this case 128. The factor employed by the multiplier 31 gives sufficient resolution to allow for manual adjustment of the delay adjust element 36 for synchronization of the system 1.

The multiplied pulses are received by the phase locked loop 33. The loop 33 has an internal oscillator, not shown, which adjusts to the frequency of the multiplied pulses. The loop 33 transmits pulses at the same frequency as the multiplied pulses, however the transmitted pulses are clean. Clean is used in the sense that the loop 33 removes spurious noise from the pulses which is not at the main pulse frequency.

The multiplied and cleaned pulses are received by the first counter 35. The counter 35 counts the multiplied and cleaned pulses up to the amount preset by the element 36 and then transmits a pulse. The transmitted pulse sets the RS flip-flop 37. When the flip-flop 37 is set, a 60 KHz signal from the oscillator 43 passes through the AND gate 39 to the counter 41 and the selection circuitry 45. Counter 41 counts a predetermined number of the 60 KHz pulses and then resets the RS flip-flop 37 which in turn stops the 60 KHz signal from being passed on to the selection circuitry 45.

The effect of the flip-flop 37, AND gate 39, oscillator 43 and counter 41 is to act as a duty cycle component 29b. The component 29 sets the length of time, or duty cycle, for which the 60 KHz signal is passed. The duty cycle may be adjusted by adjusting the predetermined second count of the counter 41.

The 60 KHz signal flows to the selection circuitry 45. When the circuitry 45 is enabled the 60 KHz signal is split, or duplicated, into two 60 KHz signals flowing through the diodes 47 to the outputs 49. The grounded resistors 51 tie the outputs 49 down to ground when no signal is flowing through the diodes 47. The resistors 51 act to reference the outputs 49. This avoids spurious signals 5 being transmitted from the transmitter 6. Two outputs 49 have been shown as two transmitters 6 are used to increase reliability. Where the system 1 is to be used in a large theatre it may be necessary to use a greater number of transmitters 6.

The counter 35 is reset by the next one-half of the first pulse from the sensor 21 allowing the process to continue.

The 60 KHz signals are sent to the transmitter 6 to be transmitted to the glasses 7. Before a signal 5 is received from the transmitter 6, the left lens 9 will be opaque and the right lens 11 transmissive. The glasses 7 used in association with the delay circuit are triggered by a 60 KHz signal. Following the trigger, the glasses 7 use internal circuitry, not shown, to cause the left lens 9 to become transmissive and the right lens 11 opaque. The internal circuitry counts the time to the next transition and causes the right lens 11 to become transmissive and the left lens 9 opaque. The internal circuitry is leading edge sensitive. Theoretically it is possible to trigger the circuitry using a single pulse, however 60 KHz signals are used for the circuitry to lock on to. This prevents spurious triggers by other frequency signals. It also allows for a great number of pulses to be sent in a short period of time. This helps to ensure each set of glasses in the theatre will receive the signal 5. The duty cycle of the second counter 41 may be adjusted to provide more pulses in the 60 KHz signal. The counter 41 may be factory preset to the specifications of a theatre or on-site adjustable using DIP switches, not shown.

The amount of the phase delay between the first pulses and the signal 5 can be adjusted by setting the thumbwheel switches of the element 36. This sets the time to which the counter 35 will count before generating a pulse. The counter 35 introduces an adjustable delay.

In order to synchronize a left to right image transition to the signal 5, an approximation is made for synchronization without adjusting the counter 35. This is done by taking into account the physical positioning of the sensor 21 and delays introduced by the mechanical link and other components of the system 1. An operator then views the images using the glasses 7. The operator adjusts the element 36 until the 3-d effect is maximized. The multiplier 31 increases the frequency of pulses allowing for fine adjustment of the delay. Other values than 128 may be used in the multiplier 31, however this has been found to allow for sufficiently fine adjustment.

The mechanical link may include belts and pulleys, not shown. Over time the mechanical components will loosen and wear. This may put the system 1 out of synchronization. The manual adjustment of the delay introduced by the unit 29 allows for a simple and effective manner of re-synchronizing the system 1.

The mechanical components such as gears will also have an associated backlash. As a result of the backlash, the phase delay between the shutter 17 and the primary mechanism will not be constant. If the edges of the first pulses utilized by section 30, to generate the delay, coincide closely in time with the image transistion then the phase delay unit 29 may be required to introduce negative and positive delays. The unit 29 may be enhanced to provide such negative and positive phase delays, however the complexity of the unit 29 will be increased accordingly. When it is determined that the first pulses are arriving in synchronization with the image transition such that negative and positive phase delays are required, the position of the sensor 21 may be physically altered to bring the pulses out of synchronization. Then only a lesser or greater positive phase delay is required and can be provided by the unit 29.

As is evident from FIG. 3c, the lenses 9, 11 have an associated rise and fall time. The rise time as represented by the rounded leading edges on FIG. 3c is substantial, whereas the fall time, represented by the substantially square trailing edges, is substantially shorter. The 3-d effect will be best when the image transitions occur between the fall and rise times or during the rise time. In order for the transition to occur during the rise time, the signal 5 must be sent slightly prior to the occurrence of a transition. The phase delay results in the signal 5 slightly leading the images 3. The low transmissiveness during the rise time tends to compensate for overlapping the transition with the partial transmissiveness of a lens 9, 11. The rise time also tends to compensate for the variation in the phase delay between the shutter 17 and the image transitions. Over time mechanical wear and loosening will increase the variation in the phase delay to such an extent that it cannot be compensated for by the low transmissiveness during the rise time. At this time it will be necessary to repair or refurbish the mechanical components to avoid degradation of the 3-d effect.

Redundancy has been introduced into the unit 29 in the form of a secondary, or back-up, section 52. The section 52 is identical to the primary section 30. Like blocks in the section 52 to blocks in the section 30 will be designated with the suffix S to represent their presence in the secondary section 52.

A secondary sensor 54 is mounted on the timing shutter 17 in a similar manner to sensor 21. The sensor 54 sends pulses to the secondary section 52 in a like manner to sensor 21. Connected between the loops 33, 33S is a sync discrimination element 56. The element 56 is further connected directly to an enable input to the circuitry 45 and through an inverter 60 to an enable input to the circuitry 45S.

The loops 33, 33S output a locked on signal to the element 56 when the loops 33, 33S are locked on to pulses from the sensors 21, 21S. When the loop 33 is locked on the element 56 enables the circuitry 45. When the loop 33 is not locked on and the loop 33S is locked on the element 56 enables the circuitry 45S. Thus, if either the primary or secondary sections 30, 52 are operating properly and receiving pulses from their sensors 21 or 21S, there will be pulses at the outputs 49. Further redundancy may be built into the system 1 such as two or more transmitters 6 and separate power supplies, not shown for the primary and secondary sections 30, 52 and the element 56.

The diodes 47 act as isolation elements isolating the primary and secondary sections 30, 52 from one another.

As the phase delays of the primary and secondary sections 30, 52 are independently settable, the sensors 21, 21S do not need to be physically positioned at the same radial location about the shutter 17.

It will be evident to those skilled in the art that other embodiments of the present invention are possible and fall within the spirit and scope of the present invention as defined by the following claims.

We claim:

1. A 3-d projection system, comprising:
    (a) means for projecting alternate eye left and right images;
    (b) at least one pair of alternate eye 3-d glasses for alternating between left and right lens transmissiveness;
    (c) a transmitter for transmitting signals to trigger the glasses to alternate at the same frequency as the images; and
    (d) a phase delay unit for delaying the transmission of the signals to synchronize left lens transmissiveness with the projection of a left image and right lens transmissiveness with the projection of a right image.

2. A 3-d system according to claim 1, the lenses having associated rise times, wherein the phase delay unit synchronizes the transmission of the signals to lead the image transitions so that the transitions occur during the rise time of the lenses.

3. A 3-d system according to claim 1, further comprising: a sensor connected between the projector and, the phase delay unit, the sensor sensing the frequency of image alternations and informing the phase delay circuit.

4. A 3-d system according to claim 3, wherein the phase delay unit includes: an adjustable delay component for producing and adjusting the delay.

5. A 3-d system according to claim 3, wherein the phase delay unit includes: a delay component for producing the delay, and a duty cycle component for controlling the duty cycle of the signal.

6. A 3-d system according to claim 5, wherein the delay component is an adjustable delay component for adjusting the delay.

7. A 3-d system according to claim 5, wherein the duty cycle component is adjustable for adjusting the duty cycle of the signal.

8. A 3-d system according to claim 5, wherein the sensor produces first pulses representative of the frequency of the transitions: and wherein the delay component having a first counter between the sensor and the transmitter counting the first pulses to a first preset amount, the signal being transmitted upon the first preset amount being reached.

9. A 3-d system according to claim 8, wherein the delay component further has a delay adjust element connected to the counter for setting the first preset amount, the delay adjust element being adjustable.

10. A 3-d system according to claim 9, wherein the delay component further has a frequency multiplier between the sensor and the first counter for receiving the first pulses, the multiplier producing for the first counter multiplied pulses having a greater frequency than the transitions.

11. A 3-d system according to claim 10, wherein the delay component further has a phase locked loop between the multiplier and the first counter, the loop locking on to the frequency of the multiplied pulses and transmitting pulses of that frequency to the first counter.

12. A 3-d system according to claim 5, wherein the duty cycle component has an oscillator enabled by the first counter when the first counter reaches the first preset amount, and a second counter counting and passing the oscillations until the second counter reaches a second preset amount, the signal having the frequency and duration of the passed oscillations.

13. A 3-d system according to claim 12, wherein the duty cycle component is adjustable by adjusting the second preset amount.

14. A 3-d system according to claims 13 or 5, wherein the delay unit includes an output between the duty cycle component and the transmitter, the output being referenced to a first position when first pulses are not being received.

15. A 3-d system according to claim 1, wherein the phase delay unit includes: a primary section, a secondary section and a sync discrimination element, the primary section synchronizing the transmissions of the signals to the left and right eye images when the primary section is functioning normally, the sync discrimination determining when the primary section is not functioning normally and selecting the secondary section, the secondary section synchronizing the transmission of the signals to the left and right eye images.

16. A 3-d system according to claim 11, wherein the delay component and the duty cycle component form a primary section, the primary section phase locked loop sending a locked on signal when it is locked on to the frequency of the first pulses, and the phase delay unit includes a secondary section and a sync discrimination element, the secondary section being identical to the primary section, the sync discrimination element receiving the locked on signals from the primary and secondary phase locked loops and selecting the secondary section for synchronization when the primary phase locked loop is not locked on and the secondary phase locked loop is, the sync discrimination element selecting the primary section otherwise.

* * * * *